(12) United States Patent
Chehrazi et al.

(10) Patent No.: US 6,301,599 B1
(45) Date of Patent: Oct. 9, 2001

(54) MULTIPLIER CIRCUIT HAVING AN OPTIMIZED BOOTH ENCODER/SELECTOR

(75) Inventors: Farzad Chehrazi, San Jose; Vojin G. Oklobdzija, Berkeley; Aamir Alam Farooqui, Sunnyvale, all of CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/280,176

(22) Filed: Mar. 29, 1999

(51) Int. Cl.$^7$ ..................................................... G06F 7/52
(52) U.S. Cl. ............................................. 708/628; 708/629
(58) Field of Search ..................... 708/628–630

(56) References Cited

U.S. PATENT DOCUMENTS

| | | | |
|---|---|---|---|
| 4,813,008 | * 3/1989 | Shigehara et al. | 708/630 |
| 5,151,875 | * 9/1992 | Sato | 708/630 |
| 5,231,415 | * 7/1993 | Hagihara | 708/630 |
| 5,325,321 | * 6/1994 | Ishida | 708/630 |
| 5,734,601 | * 3/1998 | Chu | 708/630 |

OTHER PUBLICATIONS

A. Farooqui et al.; "Multiplexer Based Adder for Media Signal Processing"; LSI System Laboratory, SONY US Research Laboratories, San Jose, CA; Integration Corp., Berkeley, CA (undated).

A. Farooqui et al.; "VLSI Implementation of Early Branch Prediction Circuits for High Performance Computing"; Dept. of Electrical and Computer Eng., University of CA, Davis, CA; Integration Berkeley, CA; 1999 IEEE.

* cited by examiner

Primary Examiner—Tan V. Mai
(74) Attorney, Agent, or Firm—Wagner,Murabito & Hao LLP

(57) ABSTRACT

An improved Booth encoder/selector circuit having an optimized critical path. The Booth encoder has a number of inverters coupled to several of the input multiplier bits. The inverted/non-inverted multiplier bits are then fed as inputs to NAND gates as well as a series of pass gates. The outputs of the pass gates are then fed as inputs to other NAND gates. The output from the NAND gates serve as control signals for controlling the Booth selector. The Booth selector is comprised of inverters and pass gates. Multiplicand bits are input to the pass gates. The control signals generated by the Booth encoder are selectively coupled to the inverters and pass gates such that they control which one of a plurality of multiplicand bits are selected for output. Basically, the Booth selector functions as a multiplexer whereby one of the following is output: the multiplicand bit is multiplied by zero, multiplied by one, multiplied by negative one, multiplied by two, or multiplied by negative two. The Booth encoder/selector is used in a multiplier circuit to minimize the number of partial products. An adder is then used to sum all of the partial products to arrive at the final answer. In the present invention, the critical path has been optimized such that the overall speed of the multiplier is greatly improved.

27 Claims, 5 Drawing Sheets

MULTIPLIER CIRCUIT HAVING AN OPTIMIZED BOOTH ENCODER/SELECTOR

FIELD OF THE INVENTION

The present invention relates to multiplier circuits. More particularly, the present invention pertains to an improved Booth encoder/selector having an extremely fast critical path.

BACKGROUND OF THE INVENTION

Multiplier circuits are found in virtually every computer, cellular telephone, and digital audio/video equipment. In fact, essentially any digital device used to handle speech, stereo, image, graphics, and multimedia content contains one or more multiplier circuits. The multiplier circuits are usually integrated within microprocessor, media co-processor, and digital signal processor chips. These multipliers are used to perform a wide range of functions such as address generation, discrete cosine transformations (DCT), Fast Fourier Transforms (FFT), multiply-accumulate, etc. As such, multipliers play a critical role in processing audio, graphics, video, and multimedia data.

It is of utmost importance that a multiplier circuit be designed to operate as fast as possible. This is because vast amounts of digital data must be processed within an extremely short amount of time. For example, generating a frame's worth of data for display onto a computer screen or digital camera entails processing upwards of over a million pixels. Often, several multiplication functions must be invoked just to rasterize a single one of these final pixel values. And for real-time applications (e.g., flight simulators, speech recognition, video teleconferencing, computer games, streaming audio/video, etc.), the overall system performance is dramatically dependent upon the speed of its multipliers.

Unfortunately, multiplication is an inherently slow operation. Adding two numbers together requires a single add operation. In contrast, multiplication requires that each of the digits of the multiplicand be multiplied by each digit of the multiplier to arrive at the partial products. The partial products must then be added together to find the final solution. For example, 123×456 requires the addition of the three partial products of (123×400)=49200+(123×50)=6150+(123×6)=738 to find the final answer of 56088. As applied to binary numbers, multiplying two 32-bit numbers would necessitate that thirty-two partial products be calculated and then thirty-two add operations need to be performed to add together all of the partial products to find the final solution. Thus, multiplications are relatively time-consuming.

A more efficient method for multiplying together two digital numbers entails the use of a Booth encoder/selector. The concept behind Booth encoder/selectors is to subdivide the multiplier into groups of bits. These bits are then encoded and used to select the appropriate bit patterns which reduces the number of partial products. An example of a prior art Booth encoder/selector is shown in FIG. 1. Although a multiplier utilizing this prior art Booth encoder/selector is faster than a conventional multiplier, it nevertheless takes a certain amount of time for the signals to be processed by the Booth encoder/selector. For instance, this prior art Booth encoder/selector design has a critical path which takes approximately an equivalent of nine NAND gate delays to complete. The critical path is defined as the logical flow through a circuit which takes the longest time to complete. The critical path is the limiting factor for how fast a circuit can complete its processing and is used as a measure of that circuit's speed.

Some designers have attempted to shorten the critical path by optimizing the encoder section. However, an optimized encoder comes at the expense of shifting some of the computational burden onto the selector. Others have attempted to optimize the selector. Again, this comes at the expense of increasing the delay associated with the other parts of the multiplier.

Thus, what is needed is a Booth encoder/selector circuit which has an optimized critical path such that the overall speed of the multiplier is improved. The present invention provides a novel solution whereby the logical design of the Booth encoder/selector according to the present invention is such that the critical path is upwards of twice as fast as typical prior art Booth encoder/selectors. Thereby, multipliers using the present invention's Booth encoder/selector design can operate at a much faster speed.

SUMMARY OF THE INVENTION

The present invention pertains to an improved Booth encoder/selector circuit having an optimized critical path. In one embodiment, the Booth encoder is comprised of a number of inverters coupled to several of the input multiplier bits. The inverted/non-inverted multiplier bits are then fed as inputs to NAND gates as well as a series of pass gates. The outputs of the pass gates are then fed as inputs to other NAND gates. The output from the NAND gates serve as control signals for controlling the Booth selector. In one embodiment, the control signals indicate a multiply by zero, a multiply by one, a multiply by negative one, a multiply by two, and a multiply by negative two operation. The Booth selector is comprised of inverters and pass gates. Multiplicand bits are input to the pass gates. The control signals are selectively coupled to the inverters and pass gates such that they control which one of the multiplicand bits are selected for output. Basically, the Booth selector functions as a multiplexer whereby one of the following is output: the multiplicand bit is multiplied by zero, multiplied by one, multiplied by negative one, multiplied by two, or multiplied by negative two. The Booth encoder/selector is used in a multiplier circuit to minimize the number of partial products. An adder is then used to sum all of the partial products to arrive at the final answer.

In the present invention, the critical path has been optimized. In one embodiment, it is traced as follows: a first inverter accepts a multiplier bit; a first transistor having a gate is coupled to an output of the first transistor; a NAND gates has an input coupled to the first transistor; a second inverter has an input coupled to an output from the NAND gate; a second transistor has a gate coupled to an output from the second inverter; and a third inverter has an input coupled to the second transistor. This critical path has a delay of approximately the equivalent of four 2-input NAND gates. And because the critical path is much shorter and faster than that of the prior art, the multiplier circuit can perform muliplications much more quickly. In turn, this enables computer and electronics systems to process multimedia, graphics, audio, and video data with greater throughput and efficiency.

BRIEF DESCRIPTION OF THE DRAWINGS

The operation of this invention can be best visualized by reference to the drawings.

DETAILED DESCRIPTION

An improved Booth encoder/selector having an optimized critical path is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
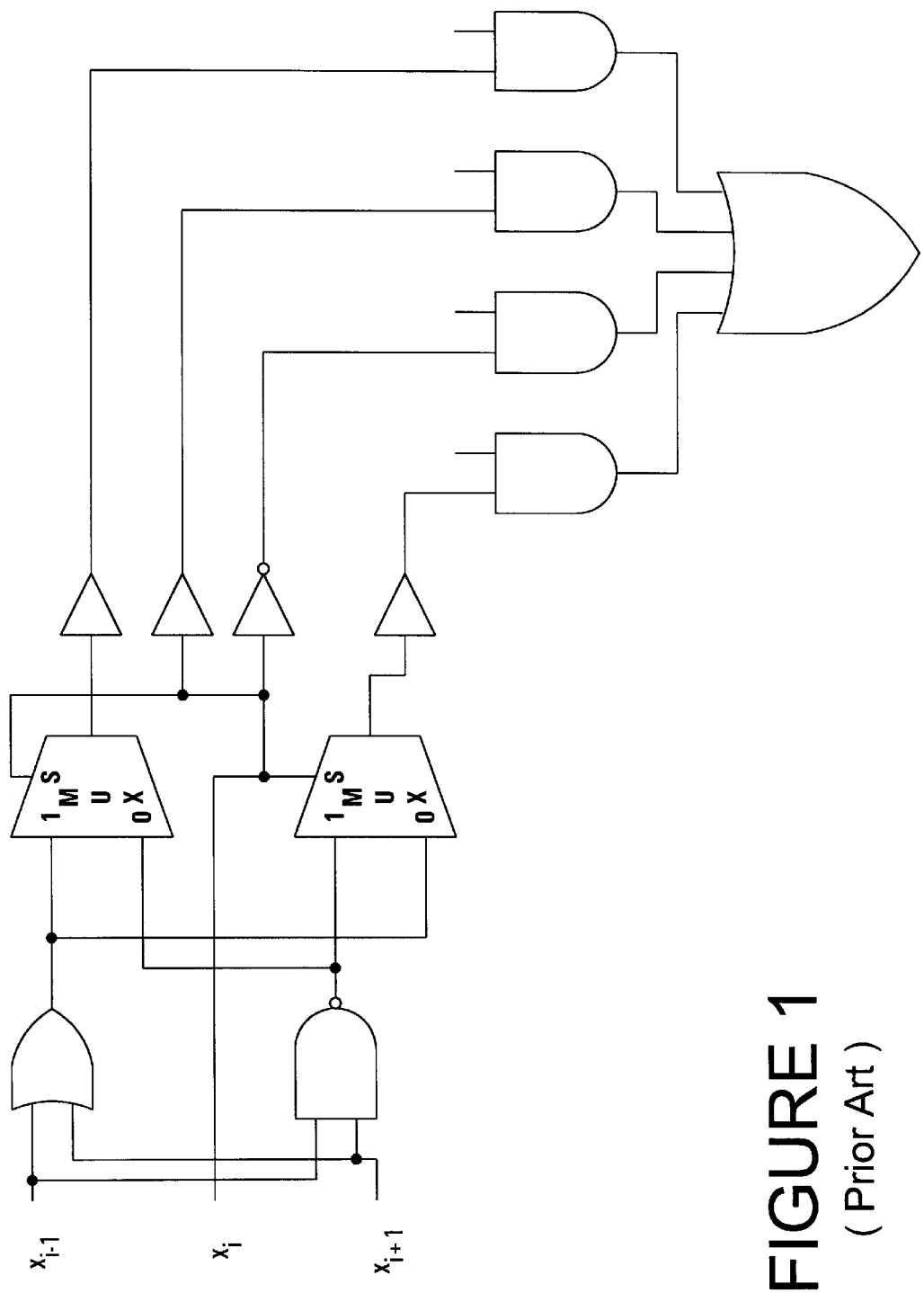
FIG. 1 shows an example of a prior art Booth encoder/selector.
Figure 2:
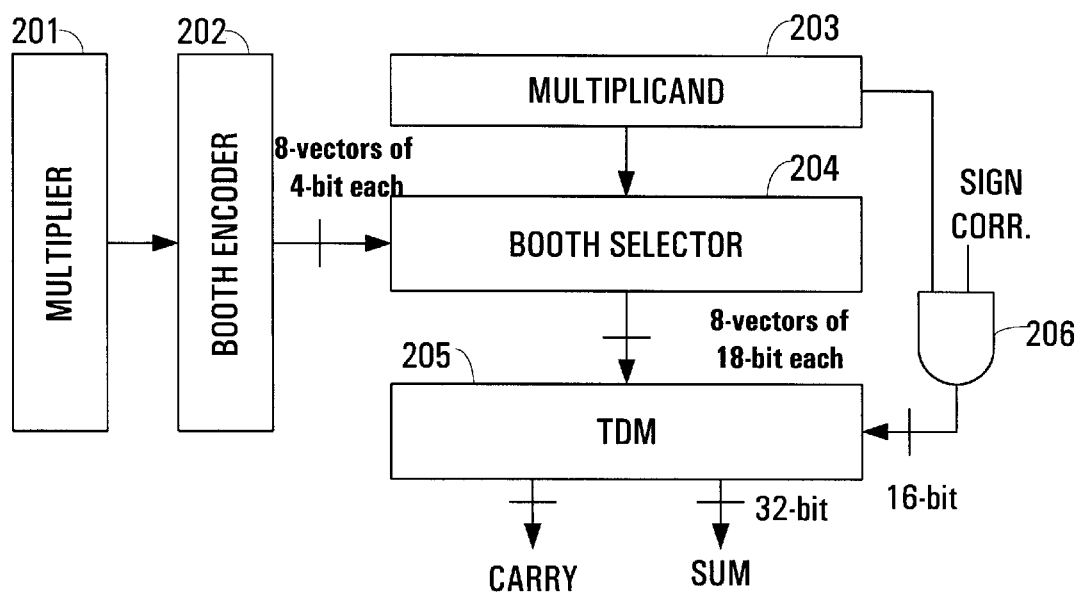
FIG. 2 shows a block diagram of a 16×16 bit multiplier circuit upon which the present invention may be practiced.

FIG. 2 shows a block diagram of a 16×16 bit multiplier circuit upon which the present invention may be practiced. The 16-bit multiplier value is input via interface 201 to eight Booth encoders 202. Meanwhile, the 16-bit multiplicand value is input via interface 203 to eight Booth selectors 204. Booth encoders 202 control the outputs of the Booth selectors. Each Booth selector 204 produces an 18-bit partial product. The Booth selector 204 produces multiplicand times 1, 2, −1, or 2 depending on the output of the Booth encoder 202. A three dimensional reduction method (TDM) adder array 205 is used to perform the carry free addition of the partial products generated by the Booth selector 204. An AND gate 206 is used to perform sign correction.

Figure 3:
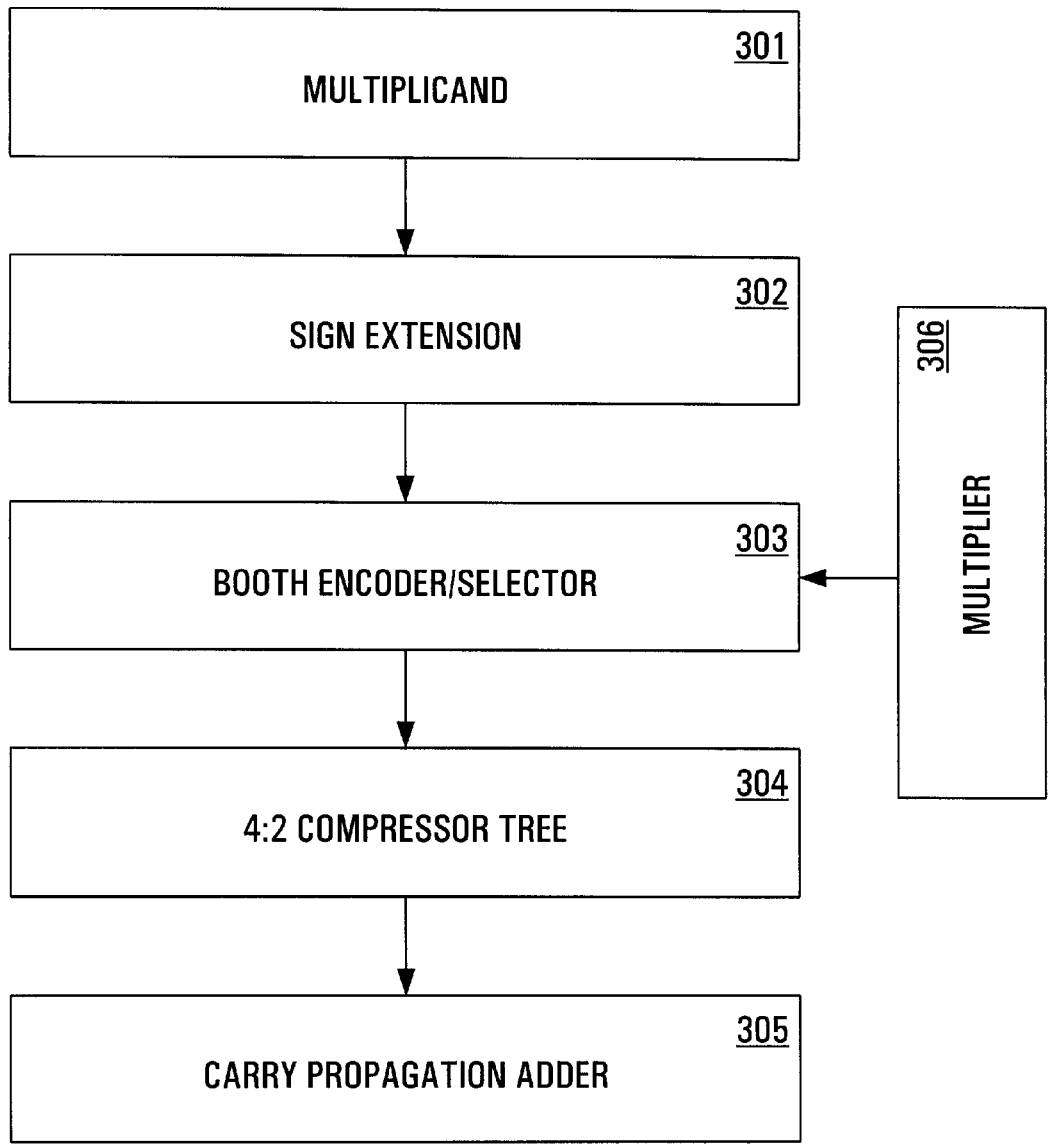
FIG. 3 is a flowchart describing the steps for performing a multiplication function as may be practiced by the present invention.

FIG. 3 is a flowchart describing the steps for performing a multiplication function as may be practiced by the present invention. In step 301, the multiplicand is supplied. A sign extension is provided in step 302. The multiplier is supplied in step 306. The Booth encoder/selector takes the multiplicand and sign extension and performs the appropriate operations on the multiplier to arrive at the partial products. A 4:2 compressor tree, in step 304, compresses the partial products. And the carry propagation adder adds the compressed partial products to generate the final answer in step 305.

Figure 4:
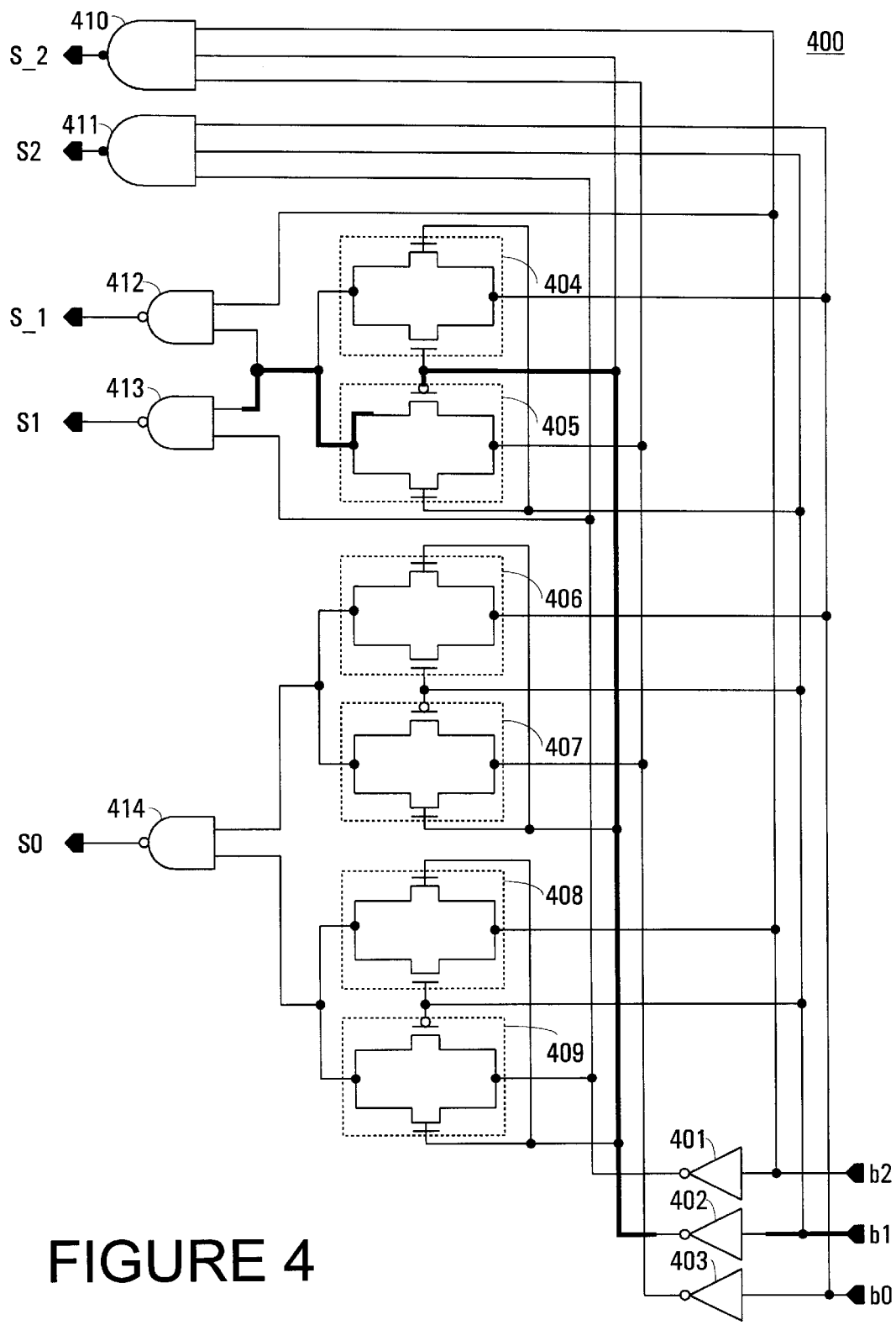
FIG. 4 shows a circuit diagram of the Booth encoder according to the currently preferred embodiment of the present invention.

FIG. 4 shows a circuit diagram of the Booth encoder according to the currently preferred embodiment of the present invention. Three bits of the multiplier are supplied as inputs b0, b0, and b2 to the Booth encoder 400. The output from the Booth encoder 400 are given as s0, s0, s_1, s2, and s_2. The 3-bit input multiplier input should output an encoded signal indicating the conditions as shown in Table 1 below.

| 3-Bit Multiplier | | | |
|---|---|---|---|
| b0 | b1 | b2 | Encoder Output |
| 0 | 0 | 0 | 0 |
| 0 | 0 | 1 | x1 |
| 0 | 1 | 0 | x1 |
| 0 | 1 | 1 | x2 |
| 1 | 0 | 0 | x-2 |
| 1 | 0 | 1 | x-1 |
| 1 | 1 | 0 | x-1 |
| 1 | 1 | 1 | 0 |

In other words, whenever a 3-bit multiplier of 000 or 111 is received, the Booth encoder should output a signal indicating that the multiplicand should be multiplied by 0. Whenever the 3-bit multiplier is 001 or 010, then the Booth encoder should output a signal indicating that the multiplicand should be multiplied by 1. If the 3-bit multiplier is 011, the Booth encoder should generate a signal indicating that the multiplicand be multiplied by 2. Likewise, if the 3-bit multiplier is 100, the Booth encoder should generate a signal indicating that the multiplicand be multiplied by negative 2. And if the 3-bit multiplier is either 101 or 110, then the Booth encoder should generate a signal indicating that the multiplicand be multiplied by negative 1.

As shown in FIG. 4 of the Booth encoder circuit diagram, the encoder outputs of 0, x1, x−1, x2, and x−2 are represented by the s0, s1, s_1, s2, and s_2 output bits. The relationship between 0, 1, x1, x−1, x2, and x−2 versus s0, s1, s_1, s2, and s_2 are given in Table 2 below.

| Encoder Output | s0 | s1 | s-1 | s2 | s-2 |
|---|---|---|---|---|---|
| 0 | 1 | 0 | 0 | 0 | 0 |
| x1 | 0 | 1 | 0 | 0 | 0 |
| x-1 | 0 | 0 | 1 | 0 | 0 |
| x2 | 0 | 0 | 0 | 1 | 0 |
| x_2 | 0 | 0 | 0 | 0 | 1 |

In other words, if the multiplicand is supposed to be multiplied by zero, then the s0 line is set to "1" while the s1, s_1, s2, and s_2 lines are set to "0's". If the multiplicand is supposed to be multiplied by one, then the s1 line is set to "1" while the s0, s_1, s2, and s_2 lines are set to "0's". If the multiplicand is supposed to be multiplied by negative 1, then the s_1 line is set to "1" while the s0, s1, s2, and s_2 lines are set to "0's". If the multiplicand is supposed to be multiplied by two, then the s2 line is set to "1" while the s0, s1, s_1, and s_2 lines are set to "0's". If the multiplicand is supposed to be multiplied by negative two, then the s_2 line is set to "1" while the s0, s1, s_1, and s2 lines are set to "0's".

Combining these two tables yields the relationships between the 3-bit multiplier (b0, b1, and b2) and the Booth encoder's output bits (s0, s1, s_1, s2, and s_2). This relationship is given in Table 3 below.

| 3-Bit Multiplier | | | Booth Encoder Outputs | | | | |
|---|---|---|---|---|---|---|---|
| b0 | b1 | b2 | s0 | s1 | s_1 | s2 | s_2 |
| 0 | 0 | 0 | 1 | 0 | 0 | 0 | 0 |
| 0 | 0 | 1 | 0 | 1 | 0 | 0 | 0 |
| 0 | 1 | 0 | 0 | 1 | 0 | 0 | 0 |
| 0 | 1 | 1 | 0 | 0 | 0 | 1 | 0 |
| 1 | 0 | 0 | 0 | 0 | 0 | 0 | 1 |
| 1 | 0 | 1 | 0 | 0 | 1 | 0 | 0 |
| 1 | 1 | 0 | 0 | 0 | 1 | 0 | 0 |
| 1 | 1 | 1 | 1 | 0 | 0 | 0 | 0 |

In other words, whenever the three multiplier bits are 000 or 111, then the Booth encoder 400 generates a "1" on the S0 line and "0's" on the s1, s_1, s2, and s_2 lines. Whenever the three multiplier bits are 001 or 010, the Booth encoder 400 generates a "1" on the s1 line and "0's" on the s0, s_1, s2, and s_2 lines. Whenever the three multiplier bits are 011, the Booth encoder 400 generates a "1" on the s2 line and "0's" on the s0, s1, s_1, and s_2 lines. Whenever the three multiplier bits are 100, the Booth encoder 400 generates a "1" on the s_2 line and "0's" on the s0, s1, s_1, and s2 lines. And whenever the three multiplier bits are 101 or 110, the Booth encoder 400 generates a "1" on the s_1 line and "0's" on the s0, s1, s2, and s_2 lines.

The logic used to accomplish the encoding includes three inverters 401–403, six pass gates 404–409, two three-input NAND gates 410–411, and three two-input NAND gates 412–414. Pass gates 404–409 are comprised of an NMOS transistor coupled in parallel with a PMOS transistor. These circuits are coupled together as follows. The multiplier bit on the b0 line is coupled as an input to pass gate 406, pass gate 404, and NAND gate 411. The multiplier bit on the b0 line is also inverted by inverter 403 and coupled as an input to pass gates 407 and 405. The inverted b0 bit is also input to NAND gate 410. The multiplier bit on the b1 line is coupled to the gate of the PMOS transistor of pass gate 408 and to the gate of the NMOS transistor of pass gate 409. The multiplier bit on the b1 line is also coupled to the gate of the PMOS transistor of pass gate 406 and to the gate of the NMOS transistor of pass gate 407. In addition, the multiplier bit on the b1 line is coupled to the gate of the PMOS transistor of pass gate 405 and to the gate of the NMOS transistor of pass gate 404. The multiplier bit on the b1 line is also coupled as one of the inputs to NAND gate 411. The multiplier bit on the b1 line is inverted by inverter 402 and then coupled to the gate of the PMOS transistor of pass gate 409, the gate of the PMOS transistor of pass gate 407, the gate of the NMOS transistor of pass gate 405, the gate of the PMOS transistor of pass gate 404, and as one of the inputs to NAND gate 410. The b2 multiplier bit on the b2 line is input to pass gate 408 and as inputs to NAND gate 412 and NAND gate 410. The b2 bit is also inverted by inverter 401. The inverted b2 bit is then coupled to the input of pass gate 409 and as inputs to NAND gate 413 and NAND gate 411. The outputs from pass gates 408 and 409 are coupled as an input to NAND gate 414. The outputs from pass gates 406 and 407 are coupled as the other input to NAND gate 414. The outputs from pass gates 404 and 405 are coupled as an input to NAND gate 412 as well as an input to NAND gate 413. The output from NAND gate 414 gives s0; the output from NAND gate 413 gives s1; the output from NAND gate 412 gives s_1, the output from NAND gate 411 gives s2; and the output from NAND gate 410 gives s_2.

Figure 5:
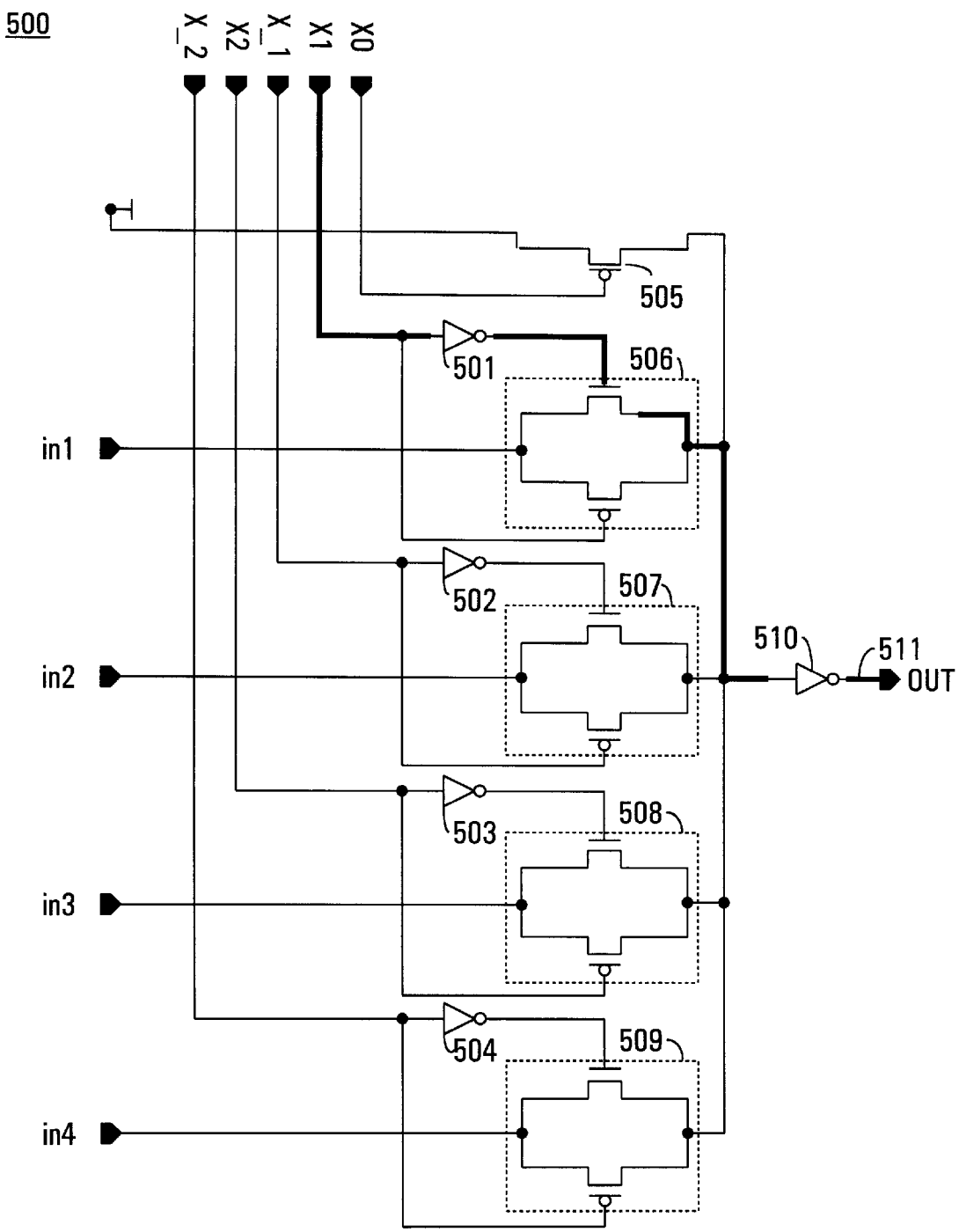
FIG. 5 shows a circuit diagram of a 5:1 multiplexer which may be used to perform the function of a Booth selector.

FIG. 5 shows a circuit diagram of a 5:1 multiplexer which may be used to perform the function of a Booth selector. This Booth selector circuit 500 is coupled to the Booth encoder circuit 400. The s0, s1 s_1, s2, and s_2 outputs from the Booth encoder circuit 400 are coupled as the inputs x0, x1, x_1, x2, and x_2, respectively, of the Booth selector circuit 500. These x0, x1, x_1, x2, and x_2 inputs are used to select from one of five possible multiplicand bits: ground, in1, in2, in3, or in4 for output (out) on line 511. If ground is selected, this indicates multiplying the multiplicand by 0 (i.e., x0). Consequently, the output will be all "0's". Otherwise, if in1 is selected, this indicates multiplying the multiplicand by one (i.e., x1). In other words, the multiplicand bit is passed through unchanged. If in2 is selected, this indicates multiplying the multiplicand by negative 1 (i.e., x_1). In other words, the multiplicand is inverted before being output. If in3 is selected, this indicates multiplying the multiplicand by two (i.e., x2). This is accomplished by arithmetically shifting the multiplicand to the left by one bit before being output. And if in4 is selected, this indicates that the multiplicand is to be multiplied by negative 2 (i.e., x_2). This is accomplished by performing an arithmetic shift left on the multiplicand and then inverting the result. Since in2 is the inverse of in1, one can provide the in2 signal by simply coupling to the in1 line with an intervening inverter. Likewise, since in4 is the inverse of in3, one can provide the in4 signal by simply coupling to the in3 line with an intervening inverter.

Table 4 below shows the relationship between the control inputs x0. x1, x_1, x2, and x_2 to the selected output for the Booth selector circuit 500.

| x0 | x1 | x_1 | x2 | x_2 | Output |
|----|----|-----|----|-----|--------|
| 1  | 0  | 0   | 0  | 0   | Ground |
| 0  | 1  | 0   | 0  | 0   | in1    |
| 0  | 0  | 1   | 0  | 0   | in2    |
| 0  | 0  | 0   | 1  | 0   | in3    |
| 0  | 0  | 0   | 0  | 1   | in4    |

In other words, when the received control inputs are 10000, then the output is ground. If the received control inputs are 01000, then the output is in1. If the received inputs are 00100, then the output is in3. And if the received control inputs are 00001, then the output is in4.

The Booth selector circuit 500 comprises five inverters 501–504 and 510; an NMOS transistor 505; and four pass gates 506–509. These logic are connected together as follows. The x0 bit on the x0 line is coupled to the gate of NMOS transistor 505. The x1 bit on the x1 line is coupled as an input to inverter 501 and also coupled to the gate of the NMOS transistor of pass gate 506. The output from inverter 501 is coupled to the gate of the PMOS transistor of pass gate 506. The x_1 bit of the x_1 line is coupled as an input to inverter 502 and to the gate of the NMOS transistor of pass gate 507. The output from inverter 502 is coupled to the gate of the PMOS transistor of pass gate 507. The x2 bit of the x2 line is coupled as an input to inverter 503 and to the gate of the NMOS transistor of pass gate 508. The output from inverter 503 is coupled to the gate of the PMOS transistor of pass gate 508. The x_2 bit of the x_2 line is coupled as an input to inverter 504 and to the gate of the NMOS transistor of pass gate 509. The output from inverter 504 is coupled to the gate of the PMOS transistor of pass gate 509. The drain of NMOS transistor 505 is coupled to ground, and its source is coupled to the input of inverter 510. The inl line is coupled to the input of pass gate 506. The in2 line is coupled to the input of pass gate 507. The in3 line is coupled to the input of pass gate 508. The in4 line is coupled to the input of pass gate 509. The outputs from the four pass gates 506–509 are all coupled to the input of inverter 510. And the output from inverter 510 gives the output from the Booth selector circuit 500.

The reason why the Booth encoder/selector design of the present invention is so much faster than that of prior art designs is because the critical path of the design according to the present invention has been optimized such that it incurs less delay. The critical path of the Booth encoder/selector design of the present invention is traced by the darkened lines depicted in FIGS. 4 and 5. Referring back to FIG. 4, the critical path is associated with the b1 line. It passes through inverter 402 and then through the NMOS transistor of pass gate 405. From there, the critical path is traced through NAND gate 413 and out s1. Continuing onto FIG. 5, the critical path continues on as x1. The critical path passes through inverter 501 and also through the PMOS transistor of pass gate 506. From pass gate 506, the critical path is routed through inverter 510 before being output from the Booth selector 500. With the present invention, the critical path encounters a delay approximately equivalent to four NAND gates. By comparison, prior art Booth encoder/selectors exhibit delays of approximately eight NAND gates. Hence, the Booth encoder/selector design of the present invention is upwards of twice as fast as prior art circuit designs.

Therefore, an improved Booth encoder/selector circuit design having an optimized critical path has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A multiplier circuit comprising:
    an encoder circuit which encodes a plurality of multiplier bits, wherein the encoder is comprised of:
        a first set of inverters for inverting the plurality of multiplier bits;
        a first set of pass gates coupled to the inverters, wherein the pass gates include an NPN transistor having a base coupled to an output of a first inverter and a PNP transistor having a base coupled to an input of the first inverter, said first set of pass gates accepting as inputs both inverted multiplier bits and non-inverted multiplier bits;
        a plurality of NAND gates coupled to the pass gates, wherein outputs from the first set of pass gates are input to the plurality of NAND gates, wherein the NAND gates output a plurality of control signals;
    a selector circuit coupled to the encoder circuit, wherein the selector circuit is comprised of:
        a second set of inverters which are coupled to receive some of the plurality of control signals generated by the encoder circuit;
        a second set of pass gates coupled to receive signals output from the inverters, wherein the second set of pass gates are coupled to receive bits corresponding to multiplicand operations and one of the bits corresponding to the multiplicand operations is selected for output by the selector circuit according to the plurality of control signals generated by the encoder circuit, the second set of pass gates comprising a first transistor having a base coupled to an output of a second inverter and a second transistor having a base coupled to an input of the second inverter;
        an output inverter coupled to the second set of pass gates which outputs a signal corresponding to a Booth encoder/selector.

2. The multiplier circuit of claim 1, wherein the encoder circuit and selector circuit comprise a Booth encoder circuit and a Booth selector circuit.

3. The multiplier circuit of claim 2, wherein the first set of inverters are comprised of three inverters for inverting three multiplier bits and the first set of pass gates are comprised of six pass gates, and the plurality of NAND gates are comprised of two three-input NAND gates and three two-input NAND gates.

4. The multiplier circuit of claim 3, wherein a first one of the three-input NAND gates has a first input connected to an inverted first multiplier bit, a second input connected to an inverted second multiplier bit, and a third input connected to a third multiplier bit and wherein a second one of the three-input NAND gates has a first input connected to a first multiplier bit, a second multiplier bit, and an inverted third multiplier bit.

5. The multiplier circuit of claim 3, wherein
    a first one of the two-input NAND gates has a first input connected to a third multiplier bit and a second input connected to an output from a first pass gate and an output from a second pass gate;
    a second one of the two-input NAND gates has a first input connected to the output from the first pass gate and the output from the second pass gate and a second input connected to an inverted third multiplier bit;
    a third one of the two-input NAND gates has a first input connected to an output from a third pass gate and an output from a fourth pass gate and a second input connected to an output from a fifth pass gate and an output from a sixth pass gate.

6. The multiplier circuit of claim 1, wherein the second set of inverters comprise four inverters, the second set of pass gates comprise four pass gates, and outputs from the four inverters are respectively coupled to gates of PNP transistors of the four pass gates.

7. The multiplier circuit of claim 6, wherein the selector circuit further comprises a transistor coupled to ground which causes a 0 to be output from the selector according to one of the control bits.

8. The multiplier circuit of claim 6, wherein the multiplicand operations include a multiply by zero, a multiply by one, a multiply by negative one, a multiply by two, and a multiply by negative two.

9. The multiplier circuit of claim 8, wherein a multiply by one signal is input to a first one of the four pass gates, a multiply by negative one signal is input to a second one of the four pass gates, a multiply by two signal is input to a third one of the four pass gates, and a multiply by negative two signal is input to a fourth one of the four pass gates.

10. The multiplier circuit of claim 9, wherein outputs from the four pass gates are all connected to the output inverter.

11. The multiplier circuit of claim 1 further comprising an adder coupled to the selector circuit which adds a plurality of partial products to produce a final multiplication answer.

12. The multiplier circuit of claim 1, wherein the encoder circuit generates a control signal indicating:
    a multiply by zero when the multiplier bits are 000 or 111;
    a multiply by one when the multiplier bits are 001 or 010;
    a multiply by negative one when the multiplier bits are 101 or 110;
    a multiply by two when the multiplier bits are 011;
    a multiply by negative two when the multiplier bits are 100.

13. The multiplier circuit of claim 1 having a critical path which exhibits a delay equivalent to approximately four NAND gates.

14. A Booth encoder/selector circuit having an improved critical path, the critical path comprising:
    a first inverter for accepting a multiplier bit;
    a first transistor having a source coupled to an output from a second inverter which accepts another multiplier bit, a gate coupled to an output of the first inverter;
    a NAND gate having an input coupled to a drain of the first transistor;
    a third inverter having an input coupled to the an output from the NAND gate;
    a second transistor having a gate coupled to an output from the third inverter, a source coupled to an output from a Booth selector circuit;

a fourth inverter having an input coupled to the second transistor.

15. The Booth encoder/selector circuit of claim 14, wherein the critical path has a delay equivalent to approximately four 2-input NAND gates.

16. The Booth encoder/selector circuit of claim 14, wherein the first transistor is part of a first pass gate and the third transistor is part of a second pass gate.

17. The Booth encoder/selector circuit of claim 14 including an encoder circuit having a first set of inverters for inverting the plurality of multiplier bits, a first set of pass gates coupled to the inverters, and a plurality of NAND gates coupled to the pass gates and inverters, wherein the NAND gates output a plurality of control signals.

18. The Booth encoder/selector circuit of claim 17 including a selector circuit coupled to the encoder circuit having a second set of inverters which are coupled to receive some of the plurality of control signals generated by the encoder circuit, a second set of pass gates coupled to the inverters, wherein the second set of pass gates are coupled to receive bits corresponding to multiplicand operations and one of the bits corresponding to the multiplicand operations is selected for output by the selector circuit according to the plurality of control signals generated by the encoder circuit, and an output inverter coupled to the second set of pass gates.

19. The Booth encoder/selector circuit of claim 18, wherein the first set of inverters are comprised of three inverters for inverting three multiplier bits and the first set of pass gates are comprised of six pass gates, and the plurality of NAND gates are comprised of two three-input NAND gates and three two-input NAND gates.

20. The Booth encoder/selector circuit of claim 19, wherein a first one of the three-input NAND gates has a first input connected to an inverted first multiplier bit, a second input connected to an inverted second multiplier bit, and a third input connected to a third multiplier bit and wherein a second one of the three-input NAND gates has a first input connected to a first multiplier bit, a second multiplier bit, and an inverted third multiplier bit.

21. The Booth encoder/selector circuit of claim 19, wherein
a first one of the two-input NAND gates has a first input connected to a third multiplier bit and a second input connected to an output from a first pass gate and an output from a second pass gate;

a second one of the two-input NAND gates has a first input connected to the output from the first pass gate and the output from the second pass gate and a second input connected to an inverted third multiplier bit;

a third one of the two-input NAND gates has a first input connected to an output from a third pass gate and an output from a fourth pass gate and a second input connected to an output from a fifth pass gate and an output from a sixth pass gate.

22. The Booth encoder/selector circuit of claim 18, wherein the second set of inverters comprise four inverters, the second set of pass gates comprise four pass gates, and outputs from the four inverters are respectively coupled to gates of PNP transistors of the four pass gates.

23. The Booth encoder/selector circuit of claim 18, wherein the selector circuit further comprises a transistor coupled to ground which causes a 0 to be output from the selector according to one of the control bits.

24. The Booth encoder/selector circuit of claim 18, wherein the multiplicand operations include a multiply by zero, a multiply by one, a multiply by negative one, a multiply by two, and a multiply by negative two.

25. The Booth encoder/selector circuit of claim 24, wherein a multiply by one signal is input to a first one of the four pass gates, a multiply by negative one signal is input to a second one of the four pass gates, a multiply by two signal is input to a third one of the four pass gates, and a multiply by negative two signal is input to a fourth one of the four pass gates.

26. The Booth encoder/selector circuit of claim 25, wherein outputs from the four pass gates are all connected to the output inverter.

27. The Booth encoder/selector circuit of claim 17, wherein the encoder circuit generates a control signal indicating:

a multiply by zero when the multiplier bits are 000 or 111;

a multiply by one when the multiplier bits are 001 or 010;

a multiply by negative one when the multiplier bits are 101 or 110;

a multiply by two when the multiplier bits are 011;

a multiply by negative two when the multiplier bits are 100.

* * * * *